July 21, 1953  D. L. ARENBERG  2,645,933
SOLIDS CHARACTERISTICS TESTER
Filed Nov. 26, 1945

INVENTOR
DAVID L. ARENBERG
BY
ATTORNEY

Patented July 21, 1953

2,645,933

UNITED STATES PATENT OFFICE 2,645,933

SOLIDS CHARACTERISTICS TESTER

David L. Arenberg, Charlestown, Mass., assignor, by mesne assignments, to the United States of America as represented by the Secretary of the Navy Application November 26, 1945, Serial No. 630,938

11 Claims. (Cl. 73—67)

This invention relates, generally, to a method of investigating elastic constants in the surface of solids, and more particularly to a method of investigating elastic constants by the use of supersonic waves.

The investigation of elastic constants in solids by subjecting them to super-sonic bombardment in a liquid bath is not new. Prior art systems consisted of sending super-sonic waves from a crystal through a solid to a pick-up crystal directly behind it. From the amplitude of the sound waves, after passing through the solid, knowledge of the constants of the solid could be derived. There are, however, limitations to the method. In the first place sound waves have to travel all the way through the solid, and consequently materials of high attenuation cannot be tested. Also the magnitude of the final wave is affected by the average velocity through the entire body, and gives no definite information about the stresses concentrated at the surfaces.

The present invention has as one of its objects to provide a method of investigating elastic constants and stresses in the surfaces of solids.

Another object is to provide a method of investigating surface stresses and internal friction in materials of high attenuation, such as plastics.

An additional object is to provide a method for rapidly checking surface uniformity, such as is desirable in the continuous production of a hardened strip metal.

The invention will be described by referring to the accompanying drawings in which.

Figure 1:
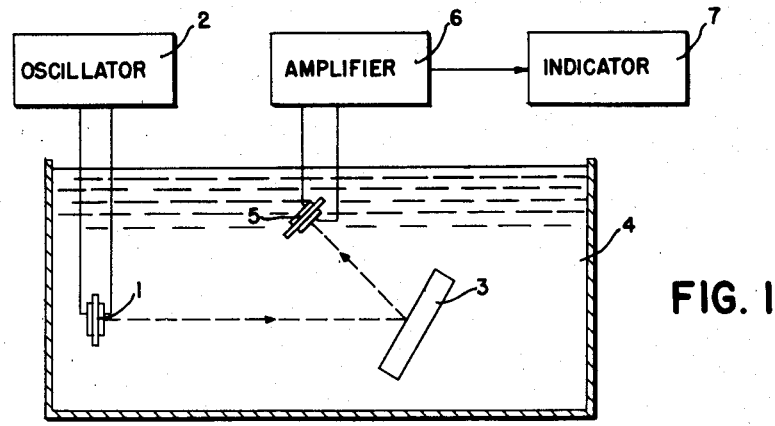
Fig. 1 is a schematic diagram of one embodiment.

Referring to Fig. 1, a quartz crystal unit 1 in conjunction with an appropriate oscillator 2 projects a supersonic beam of compressional waves in a liquid bath 4 of known dynamic properties in which the crystal is submerged. This beam strikes the surface of the solid 3, also submerged in bath 4; and at the interface of the solid 3 and the liquid bath 4 the supersonic waves will be partly reflected from the solid and partly transmitted into the solid. The reflected beam is received by the receiving crystal 5, also submerged in bath 4 amplified by an appropriate amplifier 6, and sent to an output indicator 7, where the supersonic waves may be displayed as desired.

Figure 2:
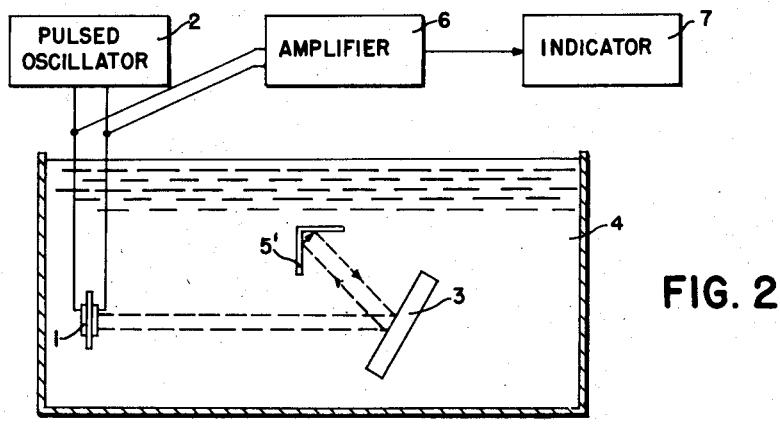
Fig. 2 is an alternative and possibly preferred embodiment.

Referring to Fig. 2, a quartz crystal unit 1 functions as both a transmitting and receiving unit. In conjunction with an appropriate oscillator 2, in this case shown as a pulsed oscillator, the crystal unit 1 projects a beam of supersonic waves pulsed at a convenient rate. These waves, after striking the surface of the solid 3, are turned by a corner reflector 5' submerged in the bath 4 back along their original path to the crystal unit 1, amplified by amplifier 6 and sent to the indicator 7 where they are displayed as desired. The reflected waves upon striking the crystal are also reflected back along the original path to the solid and each pulse may be reflected back and forth a number of times, successive reflections appearing on the indicator with decreasing amplitude. Crystal unit 1, solid 3 and receiving crystal 5 or corner reflector 5' are preferably movably mounted within bath 4. A support similar to a spectrograph table, widely used in the optics art, is ideally suited to the present invention since the angular positions of crystal unit 1 and receiving crystal 5 or corner reflector 5' with respect to solid 3 may be readily changed.

Figure 3:
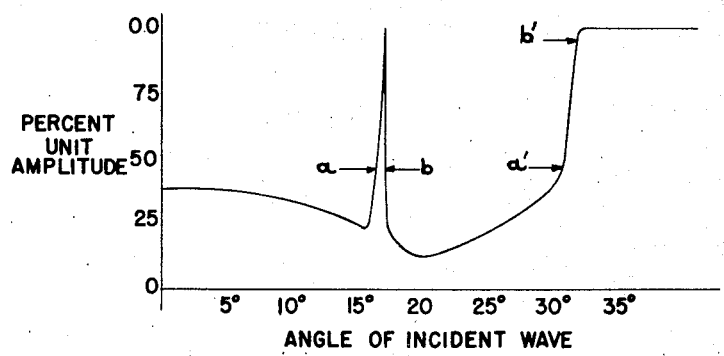
Fig. 3 is a graph plotting a curve of reflected wave amplitude against angle of incidence for a solid under test.

Referring to Fig. 3, a curve has been drawn plotting amplitude of reflected wave on the vertical axis of the graph and angle of incidence of the supersonic beam on the horizontal axis of the graph for steel in a mercury bath. The angles between points $a$ and $b$, and between points $a'$ and $b'$ represent certain sensitive regions of operation as will be hereinafter described.

Although Fig. 1 indicates a method of employing continuous waves and Fig. 2 pulsed waves, it is to be understood that these are alternative methods that could be used with either embodiment. When pulsed waves are employed the time spacing between successive pulses should be sufficient to allow echoes and reflections within solid 3 to die out. It is to be further understood that although the curve in Fig. 3 is plotted for mercury and steel, it is representative only, and other combinations of fluids and solids may be used.

In the embodiments shown in Figs. 1 and 2 the characteristics of the reflected wave will depend on three things: the angle of incidence, the relative velocity and acoustic impedances in the solid and liquid media, and finally the attenuation in the two media.

Inasmuch as the velocity of the sound waves in the liquid, and the liquid's effect on the attenuation are stable and measured quantities, the values or changes in velocity and attenuation for a given angle of incidence may be interpreted by appropriate and straight-forward formulae to indicate the elastic constants or stresses in the solid's surface.

As mentioned above, a support similar to a spectograph table may be employed to support the various movable elements of the invention. This table should and usually does provide means for making slight changes in the angular position of crystal unit 1 with respect to solid 3 and for precisely indicating the angle of incidence of the sound beam measured from the normal to the surface of solid 3. Therefore, the change in signal at angles near the critical angle where phase and amplitude change rapidly with changes in the incident angle can be carefully investigated.

The change in amplitude and phase of the signal reflected from solid 3 may be compared to changes in intensity and polarization of light reflected from a surface with changes in the angles of incidence of the light beam. It has been found that at angles near the critical angles the phase of the received signal changes rapidly even though the total distance from crystal unit 1 to solid 3 and then to receiving crystal 5 remains substantially unchanged. The fact that several such critical angles may exist is believed to be due to the fact that the supersonic energy may be propagated in several different modes within solid 3. The phase of the received signal with respect to the transmitted signal may be indicated in any of several well known ways, for example, by displaying both waves on a cathode ray tube indicator. The change in amplitude of the reflected wave is due primarily to the fact that the incident energy divides in a variable ratio between the energy reflected from the surface and the energy transmitted into solid 3. The energy transmitted into solid 3 is eventually dissipated my multiple reflections. Any signals received at the receiving crystal due to these multiple reflections may be separated out since they occur later in time than the primary reflected signal.

By plotting angle of incidence against reflected wave amplitude and/or phase, regions will be found on the curve for each type of solid where small changes in the angle of incidence produce relatively large changes in reflected wave amplitude and/or phase. It is in these last mentioned regions that changes in surface properties of the solid have the greatest effect on the amplitude and/or phase of the reflected wave, and comparative readings are most conveniently taken. The sensitive regions of operation are indicated on Fig. 3 as the incident angles between points *a* and *b*, and points *a'* and *b'* on the curve. Where extreme sensitivity is required the arrangement in Fig. 2 should be used with pulsed waves and the characteristics of the waves compared after-multiple reflections have occurred such as on the pulse appearing on the indicator as a result of the fourth or fifth reflection.

A very high supersonic frequency is a practical choice for this method, the term "very high" referring to the official Federal Communications Commission frequency designation of March 2, 1943.

The portion of the energy which is not transmitted to the solid of the supersonic wave penetrates only a few wavelengths below the surface of the solid in the designated sensitive regions of operation, and this represents only a few hundredths of an inch at such a very high frequency. At the same time, quartz crystals ground for a very high frequency are of such physical dimensions as to permit mechanical mounting in the manner described.

The uses to which this invention may be adapted are extensive. It may be used as a comparative test procedure by industrial concerns, who will not usually wish to know the exact value of elastic stress, but whose primary interest will be to determine that a surface has the proper strength or hardness. For this purpose, a standard known to have the desired surface stresses may be submerged in the bath, an angle of incidence selected to give satisfactory sensitivity, amplitude and/or phase readings observed; then readings can be taken from the solids under examination at the same angle of incidence and compared to the readings obtained from the standard. Or in continuous production of hardened metal, the strip may be run through a bath and the uniformity of the surface checked. An advantage of the method for this purpose is the rapidity with which readings can be taken.

There are other uses such as judging the surface effects overloading produces on strained solids; or determining the particle size within a material of high attenuation, on the basis that attenuation as a function of frequency is normally linear except when wavelength has a certain relation with particle size as at low frequencies.

The invention is only to be limited by the appended claims.

What is claimed is:

1. The method of investigating the elastic constants of the surface of a solid including the steps of submerging said solid in a liquid bath of known dynamic properties, projecting a beam of compressional waves at supersonic frequency on the surface of said solid at varying angles of incidence less than 90°, receiving energy reflected from the surface region of said solid, and displaying said received energy so as to indicate the phase and amplitude thereof.

2. The method of investigating the elastic constants of a surface of a solid including the steps of submerging said solid in a liquid bath of known dynamic properties, projecting a beam of compressional waves at supersonic frequency on the surface of said solid at varying angles of incidence of the beam on the solid, said angles of incidence being less than 90°, receiving energy reflected from the surface region of said solid, displaying said received energy so as to indicate the phase and amplitude thereof, repeating said steps with a solid of known surface properties similarly placed with respect to the source of and receiver of the energy and comparing the characteristics of the energy reflected from the first solid with characteristics of the energy reflected from said solid of known properties.

3. The method of claim 2 wherein the characteristic compared is the amplitude.

4. The method of claim 2 wherein the characteristic compared is the phase.

5. The method of investigating the elastic constants of a surface of a solid including the steps of submerging said solid in a liquid bath of known dynamic properties, projecting a beam of compressional waves at supersonic frequency on the surface of said solid at varying angles of incidence of the beam on said solid, said angles of incidence being less than 90° and being chosen to include the region in which the phase and amplitude of the energy reflected from the surface region of said solid change rapidly with changes in the angle of incidence of said beam on said solid, receiving energy reflected from the surface region of said solid and detecting the amplitude and phase of the received energy.

6. The method of investigating the elastic constants of the surface of a solid including the steps of submerging said solid in a liquid bath of known dynamic properties, projecting a beam of compressional waves at supersonic frequency on the surface of said solid at varying angles of incidence less than 90° such that said waves will be partially reflected from the surface region of said solid and partially transmitted into said solid beyond said surface region, receiving the reflected waves directly on a receiver unit, applying said waves to an indicator, and repeating said steps with a solid of known properties with a similarly oriented surface whereby the characteristics of the waves received from the surfaces of the two solids may be compared.

7. The method of claim 6 wherein pulsed waves are employed and the comparison of characteristics of waves displayed on the indicator is made on a pulse received after several reflections have occurred between the transmitter unit and the solid.

8. The method of investigating the elastic constants of the surface of a solid including the steps of submerging said solid in a liquid bath of known dynamic properties, projecting from a unit a pulsed beam of compressional waves at supersonic frequency on the surface of said solid at various angles of incidence, said angles of incidence being less than 90° and such that said waves will be partially reflected from the surface region of said solid and partially transmitted into said solid, turning the reflected waves back along their original path, receiving said waves on the same unit used to project said waves, and applying said waves to an indicator to determine the phase and amplitude of the received waves.

9. The method of claim 8 with the addition of repeating said steps with a solid of known properties having a surface similarly oriented with respect to said unit whereby the characteristics of waves from the two solids can be compared.

10. Apparatus for investigating the elastic constants of the surface of a solid comprising, a tank containing a liquid of known dynamic properties, means for retaining said solid in said tank, means within said tank for projecting a beam of compressional waves at supersonic frequency on the surface of said solid along a path displaced from the normal to said surface, means for receiving a portion of said beam reflected from the surface region of said solid, and an indicator coupled to said receiving means for providing a visual display of said received wave.

11. Apparatus for investigating the elastic constants of the surface of a solid comprising, a tank containing a liquid of known dynamic properties, means for retaining said solid within said tank, a crystal transducer within said tank for projecting and receiving a pulsed beam of compressional waves at supersonic frequency, the angle of incidence of said projected wave being other than normal to said surface, a corner reflector also submerged in said tank for receiving waves from said surface and reflecting waves to said surface and an indicator coupled to said transducer, said indicator being adapted to provide a visual indication of the phase and amplitude of the received signal.

DAVID L. ARENBERG.

References Cited in the file of this patent

UNITED STATES PATENTS

| Number | Name | Date |
|---|---|---|
| 2,043,984 | Alder | June 16, 1936 |
| 2,060,009 | Alder | Nov. 10, 1936 |
| 2,378,237 | Morris | June 12, 1945 |
| 2,394,461 | Mason | Feb. 5, 1946 |
| 2,416,337 | Mason | Feb. 25, 1947 |
| 2,527,208 | Berry et al. | Oct. 24, 1950 |
| 2,592,134 | Firestone | Apr. 8, 1952 |